(12) United States Patent
Eliaz

(10) Patent No.: US 8,976,911 B2
(45) Date of Patent: *Mar. 10, 2015

(54) JOINT SEQUENCE ESTIMATION OF SYMBOL AND PHASE WITH HIGH TOLERANCE OF NONLINEARITY

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,060

(22) Filed: Dec. 9, 2013

(65) Prior Publication Data

US 2014/0161158 A1 Jun. 12, 2014

Related U.S. Application Data

(63) Continuation of application No. 13/755,043, filed on Jan. 31, 2013, now Pat. No. 8,605,832.

(60) Provisional application No. 61/662,085, filed on Jun. 20, 2012, provisional application No. 61/726,099, filed on Nov. 14, 2012, provisional application No. 61/723,774, filed on Nov. 26, 2012, provisional application No. 61/747,132, filed on Dec. 28, 2012.

(51) Int. Cl.
*H04L 27/06* (2006.01)
*H04L 27/36* (2006.01)
(Continued)

(52) U.S. Cl.
CPC ............... *H04L 27/366* (2013.01); *H04B 1/10* (2013.01); *H04L 23/02* (2013.01); *H04L 27/04* (2013.01);
(Continued)

(58) Field of Classification Search
CPC ................ H04B 1/709; H04B 1/7105; H04L 25/03305; H04L 25/03331
USPC ......... 375/150, 262, 263, 290, 316, 340, 341, 375/343, 348; 714/794, 795, 796; 360/31
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |

(Continued)

OTHER PUBLICATIONS

Faulkner, Michael, "Low-Complex |C| Cancellation for Improving Doppler Performance in OFDM Systems", Center for Telecommunication and Microelectronics, 1-4244-0063-5/06/$2000 (c) 2006 IEEE. (5 pgs).

(Continued)

*Primary Examiner* — Leon Flores
(74) *Attorney, Agent, or Firm* — McAndrews, Held & Malloy, Ltd.

(57) ABSTRACT

A method and system for a sequence estimation in a receiver, such as for use when receiving a sample of a received intersymbol correlated (ISC) signal corresponding to a transmitted vector of L symbols, with L being a integer greater than 1, and with symbol L being a most-recent symbol and symbol 1 being least recent symbol of the vector. A plurality of candidate vectors may be generated, wherein element L−m of each candidate vector holding one of a plurality of possible values of the symbol L−m, with m is an integer greater than or equal to 1, and elements L−m+1 through L of each candidate vectors holding determined filler values. A plurality of metrics may be generated based on the plurality of candidate vectors, and based on the generated plurality of metrics, a best one of the possible values of the symbol L−m may be selected.

20 Claims, 10 Drawing Sheets

(51) Int. Cl.
| | | |
|---|---|---|
| *H04B 1/10* | (2006.01) | |
| *H04L 23/02* | (2006.01) | |
| *H04L 27/04* | (2006.01) | |
| *H04L 27/00* | (2006.01) | |
| *H04L 27/02* | (2006.01) | |
| *H04L 25/03* | (2006.01) | |
| *H04L 27/01* | (2006.01) | |
| *H04L 7/00* | (2006.01) | |
| *G06F 11/10* | (2006.01) | |
| *H04B 1/16* | (2006.01) | |
| *H04L 1/20* | (2006.01) | |
| *H04B 1/709* | (2011.01) | |
| *H04B 1/04* | (2006.01) | |

(52) U.S. Cl.
CPC .............. *H04L 27/00* (2013.01); *H04L 27/02* (2013.01); *H04L 25/03178* (2013.01); *H04L 27/01* (2013.01); *H04L 25/03834* (2013.01); *H04L 27/36* (2013.01); *H04L 25/03949* (2013.01); *H04L 7/0087* (2013.01); *H04L 25/03006* (2013.01); *G06F 11/10* (2013.01); *H04B 1/16* (2013.01); *H04L 25/03057* (2013.01); *H04L 25/03305* (2013.01); *H04L 25/03318* (2013.01); *H04L 25/03337* (2013.01); *H04L 1/206* (2013.01); *H04L 25/03038* (2013.01); *H04B 1/709* (2013.01); *H04L 25/03197* (2013.01); *H04L 25/03267* (2013.01); *H04B 1/0475* (2013.01); *H04B 2001/0416* (2013.01)
USPC ........... 375/341; 375/150; 375/262; 375/263; 375/290; 375/316; 375/340; 375/348; 714/794; 714/795; 714/796; 360/31

(56) References Cited

U.S. PATENT DOCUMENTS

| | | | |
|---|---|---|---|
| 4,797,925 | A | 1/1989 | Lin |
| 5,111,484 | A | 5/1992 | Karabinis |
| 5,131,011 | A | 7/1992 | Bergmans et al. |
| 5,202,903 | A | 4/1993 | Okanoue |
| 5,249,200 | A | 9/1993 | Chen et al. |
| 5,283,813 | A | 2/1994 | Shalvi et al. |
| 5,291,516 | A | 3/1994 | Dixon et al. |
| 5,394,439 | A | 2/1995 | Hemmati |
| 5,459,762 | A | 10/1995 | Wang et al. |
| 5,590,121 | A | 12/1996 | Geigel et al. |
| 5,602,507 | A | 2/1997 | Suzuki |
| 5,757,855 | A | 5/1998 | Strolle et al. |
| 5,784,415 | A | 7/1998 | Chevillat et al. |
| 5,818,653 | A | 10/1998 | Park et al. |
| 5,886,748 | A | 3/1999 | Lee |
| 5,889,823 | A | 3/1999 | Agazzi et al. |
| 5,915,213 | A | 6/1999 | Iwatsuki et al. |
| 5,930,309 | A | 7/1999 | Knutson et al. |
| 6,009,120 | A | 12/1999 | Nobakht |
| 6,167,079 | A | 12/2000 | Kinnunen et al. |
| 6,233,709 | B1 | 5/2001 | Zhang et al. |
| 6,272,173 | B1 | 8/2001 | Hatamian |
| 6,335,954 | B1 | 1/2002 | Bottomley et al. |
| 6,516,437 | B1 | 2/2003 | Van Stralen et al. |
| 6,532,256 | B2 | 3/2003 | Miller |
| 6,535,549 | B1 | 3/2003 | Scott et al. |
| 6,697,441 | B1 | 2/2004 | Bottomley et al. |
| 6,785,342 | B1 | 8/2004 | Isaksen et al. |
| 6,871,208 | B1 | 3/2005 | Guo et al. |
| 6,968,021 | B1 | 11/2005 | White et al. |
| 6,985,709 | B2 | 1/2006 | Perets |
| 7,158,324 | B2 | 1/2007 | Stein et al. |
| 7,190,288 | B2 | 3/2007 | Robinson et al. |
| 7,205,798 | B1 | 4/2007 | Agarwal et al. |
| 7,206,363 | B2 | 4/2007 | Hegde et al. |
| 7,215,716 | B1 | 5/2007 | Smith |
| 7,467,338 | B2 | 12/2008 | Saul |
| 7,830,854 | B1 | 11/2010 | Sarkar et al. |
| 7,974,230 | B1 | 7/2011 | Talley et al. |
| 8,005,170 | B2 | 8/2011 | Lee et al. |
| 8,059,737 | B2 | 11/2011 | Yang |
| 8,175,186 | B1 | 5/2012 | Wiss et al. |
| 8,199,804 | B1 | 6/2012 | Cheong |
| 8,248,975 | B2 | 8/2012 | Fujita et al. |
| 8,351,536 | B2 | 1/2013 | Mazet et al. |
| 8,422,589 | B2 | 4/2013 | Golitschek Edler Von Elbwart et al. |
| 8,526,523 | B1 | 9/2013 | Eliaz |
| 8,548,072 | B1 | 10/2013 | Eliaz |
| 8,548,089 | B2 | 10/2013 | Agazzi et al. |
| 8,548,097 | B1 | 10/2013 | Eliaz |
| 8,553,821 | B1 | 10/2013 | Eliaz |
| 8,559,494 | B1 | 10/2013 | Eliaz |
| 8,559,496 | B1 | 10/2013 | Eliaz |
| 8,559,498 | B1 | 10/2013 | Eliaz |
| 8,565,363 | B1 | 10/2013 | Eliaz |
| 8,566,687 | B1 | 10/2013 | Eliaz |
| 8,571,131 | B1 | 10/2013 | Eliaz |
| 8,571,146 | B1 | 10/2013 | Eliaz |
| 8,572,458 | B1 | 10/2013 | Eliaz |
| 8,582,637 | B1 | 11/2013 | Eliaz |
| 8,599,914 | B1 | 12/2013 | Eliaz |
| 8,605,832 | B1 | 12/2013 | Eliaz |
| 8,665,941 | B1 | 3/2014 | Eliaz |
| 8,665,992 | B1 | 3/2014 | Eliaz |
| 8,666,000 | B2 | 3/2014 | Eliaz |
| 8,675,769 | B1 | 3/2014 | Eliaz |
| 8,675,782 | B2 | 3/2014 | Eliaz |
| 8,681,889 | B2 | 3/2014 | Eliaz et al. |
| 8,744,003 | B2 | 6/2014 | Eliaz |
| 2001/0008542 | A1 | 7/2001 | Wiebke et al. |
| 2002/0016938 | A1 | 2/2002 | Starr |
| 2002/0123318 | A1 | 9/2002 | Lagarrigue |
| 2002/0150065 | A1 | 10/2002 | Ponnekanti |
| 2002/0150184 | A1 | 10/2002 | Hafeez et al. |
| 2002/0172297 | A1 | 11/2002 | Ouchi et al. |
| 2003/0016741 | A1 | 1/2003 | Sasson et al. |
| 2003/0135809 | A1 | 7/2003 | Kim |
| 2003/0210352 | A1 | 11/2003 | Fitzsimmons et al. |
| 2004/0037374 | A1 | 2/2004 | Gonikberg |
| 2004/0086276 | A1 | 5/2004 | Lenosky et al. |
| 2004/0120409 | A1 | 6/2004 | Yasotharan et al. |
| 2004/0142666 | A1 | 7/2004 | Creigh et al. |
| 2004/0170228 | A1 | 9/2004 | Vadde |
| 2004/0174937 | A1 | 9/2004 | Ungerboeck |
| 2004/0227570 | A1 | 11/2004 | Jackson et al. |
| 2004/0240578 | A1 | 12/2004 | Thesling |
| 2004/0257955 | A1 | 12/2004 | Yamanaka et al. |
| 2005/0047517 | A1 | 3/2005 | Georgios et al. |
| 2005/0123077 | A1 | 6/2005 | Kim |
| 2005/0135472 | A1 | 6/2005 | Higashino |
| 2005/0220218 | A1 | 10/2005 | Jensen et al. |
| 2005/0265470 | A1 | 12/2005 | Kishigami et al. |
| 2005/0276317 | A1 | 12/2005 | Jeong et al. |
| 2006/0067396 | A1 | 3/2006 | Christensen |
| 2006/0109780 | A1 | 5/2006 | Fechtel |
| 2006/0171489 | A1 | 8/2006 | Ghosh et al. |
| 2006/0239339 | A1 | 10/2006 | Brown et al. |
| 2006/0245765 | A1 | 11/2006 | Elahmadi et al. |
| 2006/0280113 | A1 | 12/2006 | Huo |
| 2007/0092017 | A1 | 4/2007 | Abedi |
| 2007/0098090 | A1 | 5/2007 | Ma et al. |
| 2007/0098116 | A1 | 5/2007 | Kim et al. |
| 2007/0110177 | A1 | 5/2007 | Molander et al. |
| 2007/0110191 | A1 | 5/2007 | Kim et al. |
| 2007/0127608 | A1 | 6/2007 | Scheim et al. |
| 2007/0140330 | A1 | 6/2007 | Allpress et al. |
| 2007/0189404 | A1 | 8/2007 | Baum et al. |
| 2007/0213087 | A1 | 9/2007 | Laroia et al. |
| 2007/0230593 | A1 | 10/2007 | Eliaz et al. |
| 2007/0258517 | A1 | 11/2007 | Rollings et al. |
| 2007/0291719 | A1 | 12/2007 | Demirhan et al. |
| 2008/0002789 | A1 | 1/2008 | Jao et al. |
| 2008/0049598 | A1 | 2/2008 | Ma et al. |

(56) References Cited

U.S. PATENT DOCUMENTS

| | | |
|---|---|---|
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | McKown |
| 2009/0213908 A1 | 8/2009 | Bottomley |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0208774 A1 | 8/2010 | Guess et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0074500 A1 | 3/2011 | Bouillet et al. |
| 2011/0074506 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0121257 A1 | 5/2013 | He et al. |

OTHER PUBLICATIONS

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674,1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

M = 4 (α, β, χ, δ);
Su = 3; P = 3;
Q = HPSE_depth = 4

JOINT SEQUENCE ESTIMATION OF SYMBOL AND PHASE WITH HIGH TOLERANCE OF NONLINEARITY

CLAIM OF PRIORITY

This patent application is a continuation of U.S. patent application Ser. No. 13/755,043 filed on Jan. 31, 2013 (now patented as U.S. Pat. No. 8,605,832), which in turn, claims priority to U.S. Provisional Patent Application Ser. No. 61/662,085 titled "Apparatus and Method for Efficient Utilization of Bandwidth" and filed on Jun. 20, 2012, U.S. Provisional Patent Application Ser. No. 61/726,099 titled "Modulation Scheme Based on Partial Response" and filed on Nov. 14, 2012, and U.S. Provisional Patent Application Ser. No. 61/729,774 titled "Modulation Scheme Based on Partial Response" and filed on Nov. 26, 2012. This application is also a non-provisional of U.S. Provisional Patent Application Ser. No. 61/747,132 titled "Modulation Scheme Based on Partial Response" and filed on Dec. 28, 2012.

Each of the above-identified applications is hereby incorporated herein by reference in its entirety.

INCORPORATION BY REFERENCE

This application makes reference to:

U.S. patent application Ser. No. 13/754,998, titled "Design and Optimization of Partial Response Pulse Shape Filter," and filed on Jan. 31, 2013;

U.S. patent application Ser. No. 13/755,001, titled "Constellation Map Optimization For Highly Spectrally Efficient Communications," and filed on Jan. 31, 2013;

U.S. Pat. No. 8,571,131, titled "Dynamic Filter Adjustment for Highly-Spectrally-Efficient Communications," and filed on Jan. 31, 2013;

U.S. Pat. No. 8,559,494, titled "Timing Synchronization for Reception of Highly-Spectrally-Efficient Communications," and filed on Jan. 31, 2013;

U.S. Pat. No. 8,599,914, titled "Feed Forward Equalization for Highly-Spectrally-Efficient Communications," and filed on Jan. 31, 2013;

U.S. patent application Ser. No. 13/755,021, titled "Decision Feedback Equalizer for Highly-Spectrally-Efficient Communications," and filed on Jan. 31, 2013;

U.S. patent application Ser. No. 13/755,025, titled "Decision Feedback Equalizer with Multiple Cores for Highly-Spectrally-Efficient Communications," and filed Jan. 31, 2013;

U.S. Pat. No. 8,559,498, titled "Decision Feedback Equalizer Utilizing Symbol Error Rate Biased Adaptation Function for Highly-Spectrally-Efficient Communications," and filed on Jan. 31, 2013;

U.S. Pat. No. 8,548,097, titled "Coarse Phase Estimation for Highly-Spectrally-Efficient Communications," and filed on Jan. 31, 2013;

U.S. Pat. No. 8,565,363, titled "Fine Phase Estimation for Highly Spectrally Efficient Communications," and filed on Jan. 31, 2013.

Each of the above stated applications is hereby incorporated herein by reference in its entirety.

TECHNICAL FIELD

Aspects of the present application relate to electronic communications. More specifically, certain implementations of the present disclosure relate to joint sequence estimation of symbol and phase with high tolerance of nonlinearity.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for joint sequence estimation of symbol and phase with high tolerance of nonlinearity, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
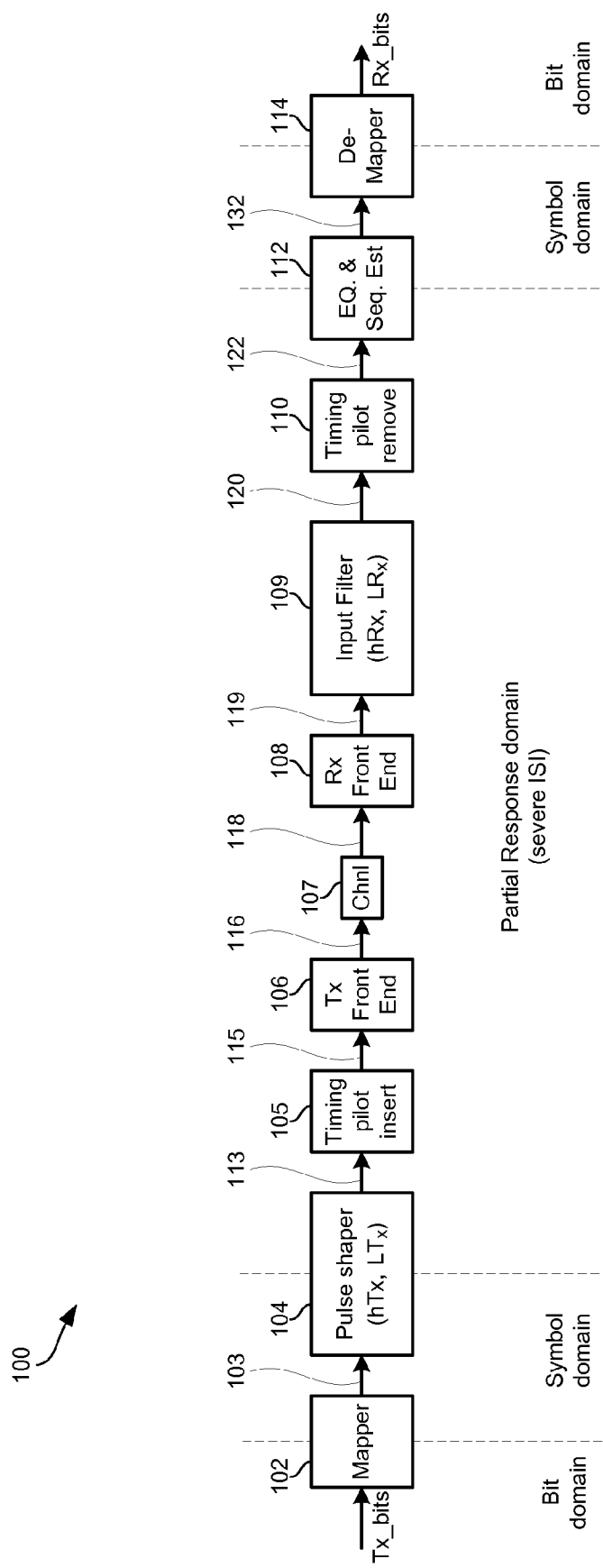
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e. without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g., a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
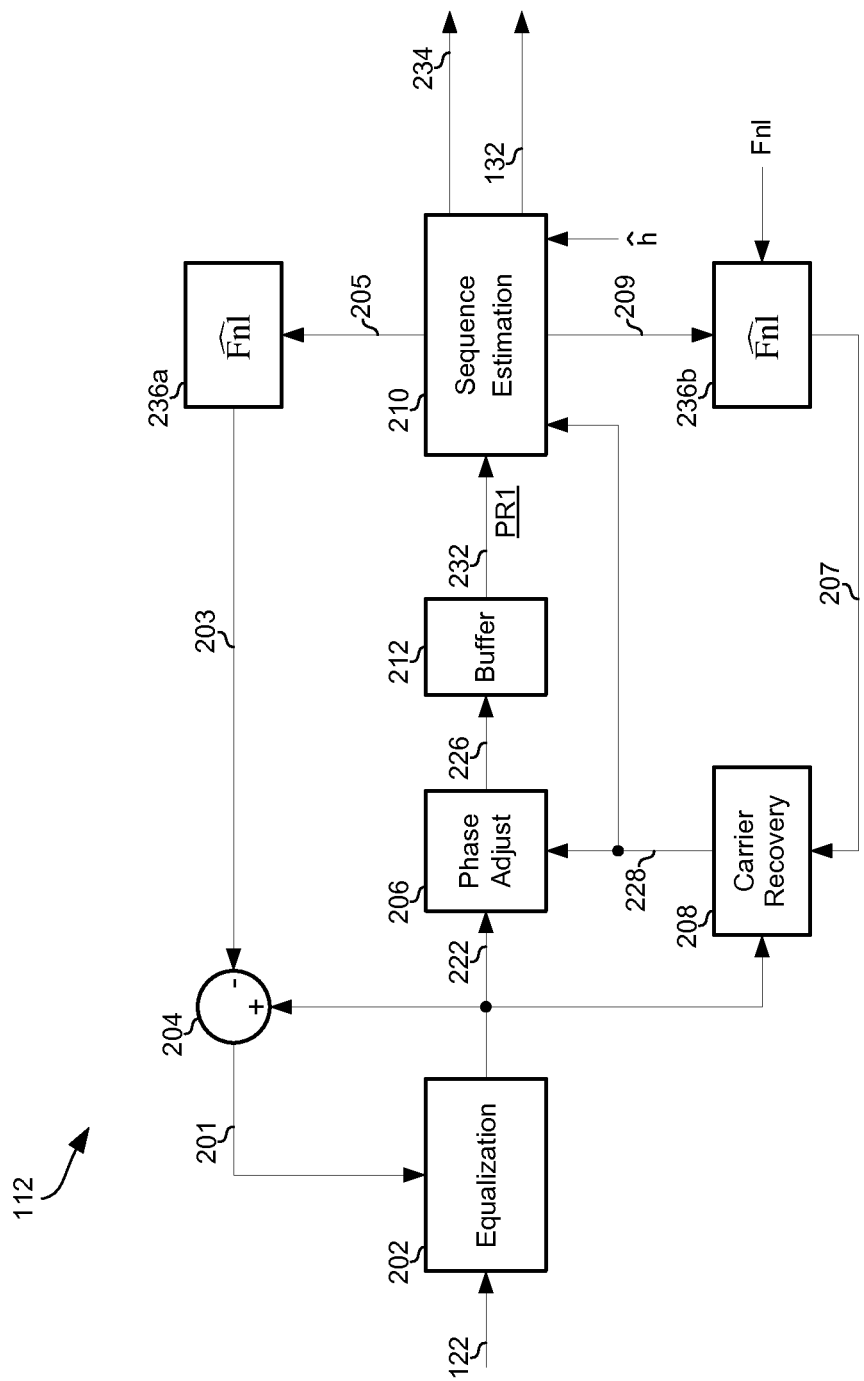
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232.

The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficientsfor example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
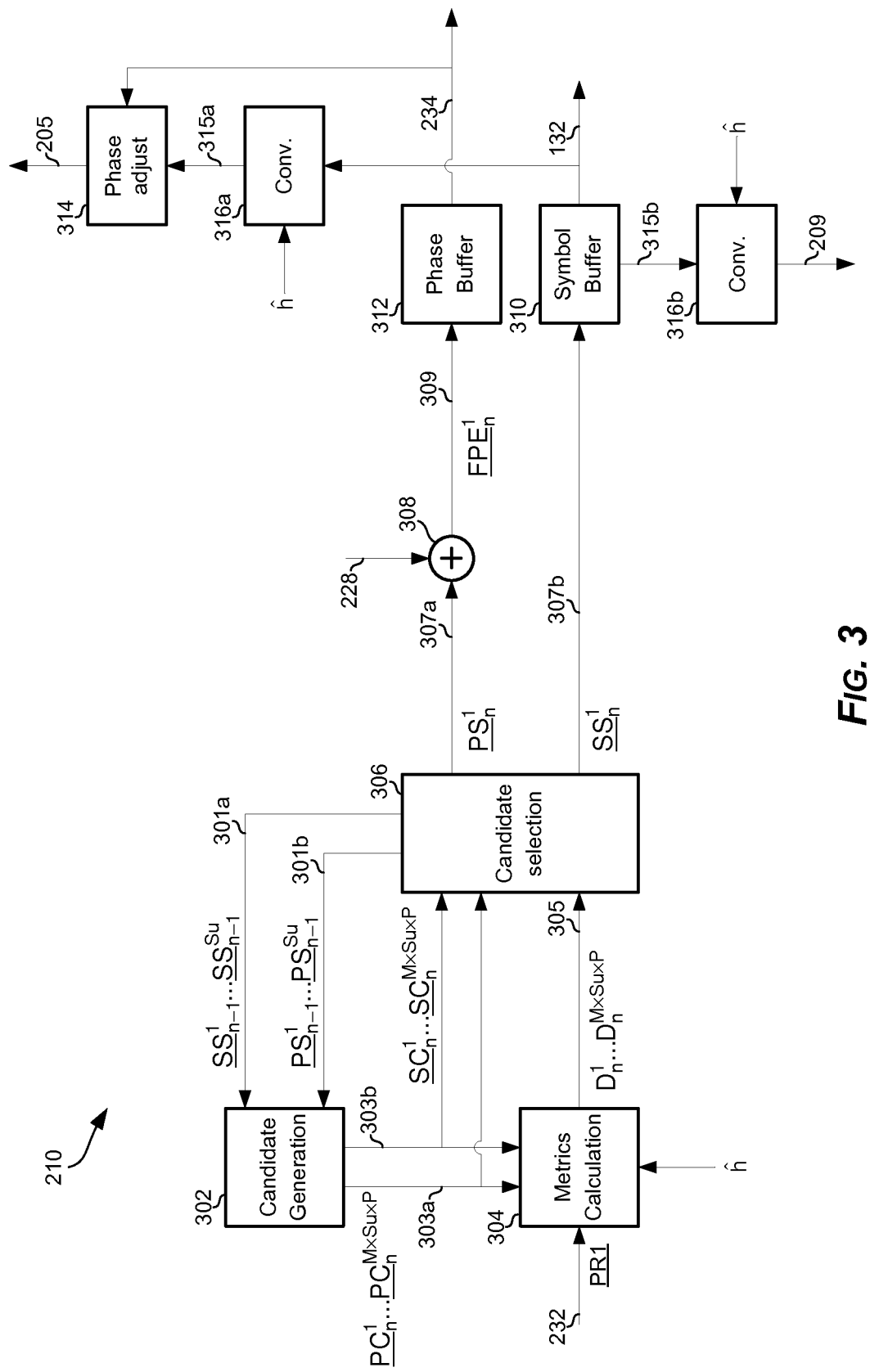
FIG. 3 is a block diagram depicting an example sequence estimation circuit for use in a system configured for low-complexity, highly-spectrally-efficient communications.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$, and the signal 303b conveying the symbol candidate vectors $SC_n^1 \ldots SC_n^{M \times Su \times P}$, where underlining indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below with respect to FIGS. 5A-5E and in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols. An example implementation of the metrics calculation block is described below with reference to FIG. 4.

The candidate selection circuit 306 may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol and/or information bits of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described below with reference to FIGS. 5A-5C and/or in the United States patent application titled "Low-Complexity, Highly-Spectrally-Efficient Communications," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described in the United States patent application titled "Low-Complexity, Highly-Spectrally-Efficient Communications," which is incorporated herein by reference, as set forth above.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response, resulting in the partial response signal 315a. Similarly, the convolution circuit 316b may be operable to convolve the signal 317 with response ĥ, resulting in the partial response signal 209. As noted above, response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response ĥ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
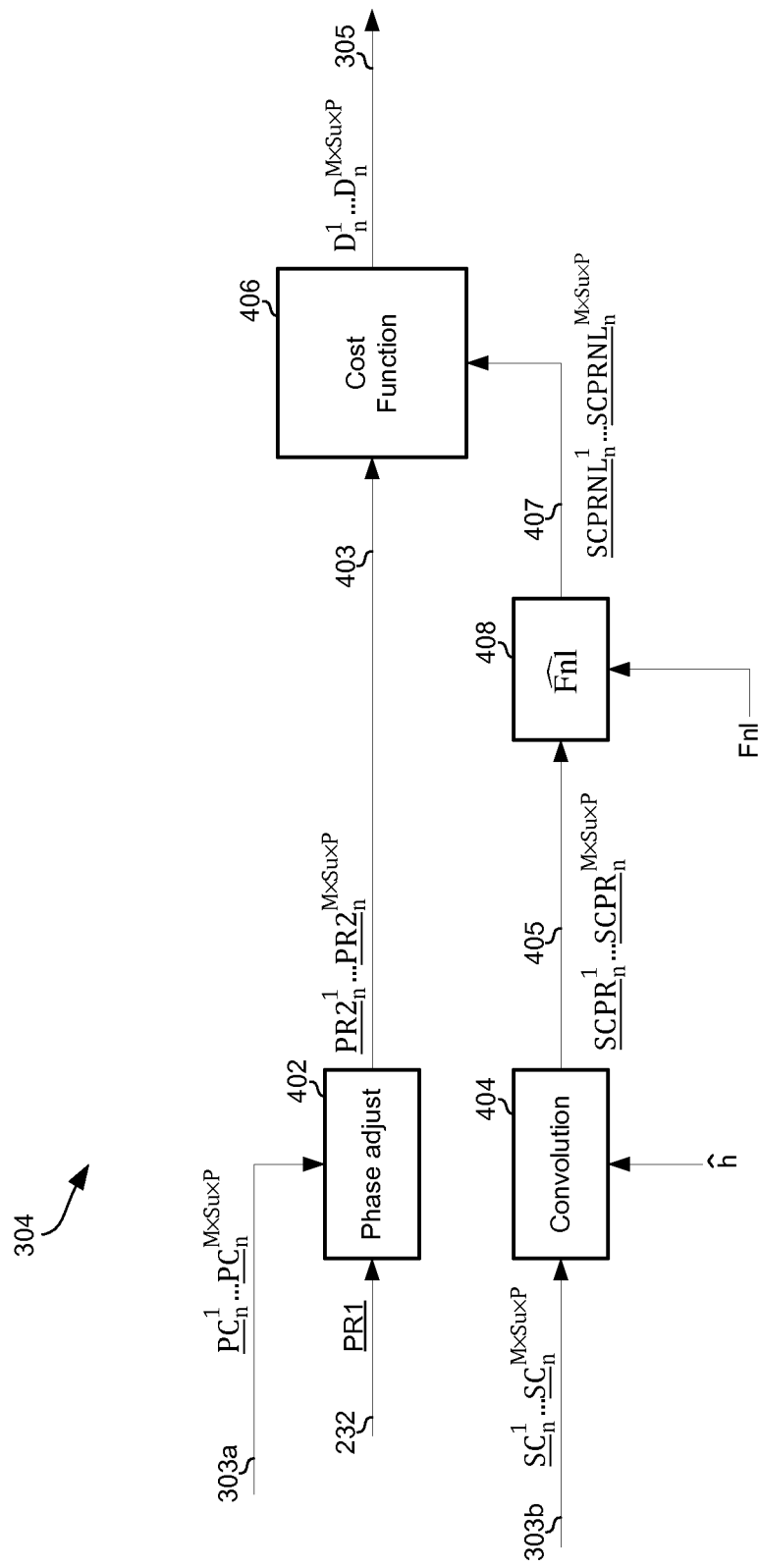
FIG. 4 is a block diagram depicting an example metrics calculation circuit for use in a system configured for low-complexity, highly-spectrally-efficient communications.

FIG. 4 is a block diagram depicting an example metrics calculation circuit for use in a system configured for low-complexity, highly-spectrally-efficient communications. Shown is a phase adjust circuit 402, a convolution circuit 404, a cost function calculation circuit 406, and non-linear modeling circuit 408. The phase adjust circuit 402 may phase shift one or more elements of the vector PR1 (conveyed via signal 232) by a corresponding one or more values of the phase candidate vectors $PC_n^1 \ldots PC_n^{M \times Su \times P}$. The signal 403 output by the phase adjust circuit 402 thus conveys a plurality of partial response vectors $PR2_n^1 \ldots PR2_n^{M \times Su \times P}$, each of which comprises a plurality of phase-adjusted versions of PR1.

The circuit 404, which performs a convolution, may comprise a FIR filter or IIR filter, for example. The circuit 404 may be operable to convolve the symbol candidate vectors $SC_n^1 \ldots SC_n^{M \times Su \times P}$ with ĥ. The signal 405 output by the circuit 404 thus conveys vectors $SCPR_n^1 \ldots SCPR_n^{M \times Su \times P}$, each of which is a candidate partial response vector. The disclosure, however, may not limited to application of convolution during sequence estimation, which (the convolution) be only a particular approach used in instances where the system is configured for partial response based communication. In general, linear combination may be applied (e.g., in the form of matrix multiplication) between the candidate vectors $SC_n^1 \ldots SC_n^{M \times Su \times P}$ and a corresponding plurality of linear combination weights. In other words, linear combination (e.g., matrix multiplications) may be associated with use ISC signals at large, while convolution may be particularly associated with partial response signals. This claim covers ISC signals—i.e. the convolution of symbols with partial response taps may be equivalent to an application of linear combination of symbols with the filter taps being the linear combination weights.

The non-linear modeling circuit 408 may apply the non-linearity function $\widehat{Fnl}$ (e.g., model of the non-linearity seen by the received signal en route to the circuit 210) to the signal 405 resulting in the signal 407. The signal 407 output by the circuit 408 thus conveys vectors $SCPRNL_n^1 \ldots SCPRNL_n^{M \times Su \times P}$, each of which is a non-linear adjusted candidate partial response vector.

Metrics related to the sequence estimation candidates may be accumulated at each iteration with the candidate branch metric being calculated for the new received sample. In instances where the non-linear model incorporates memory (e.g., the outcome of the model output may be a function of previous partial response samples) the metric may be updated regressively. For example, assuming that the non-linear model has memory of order 1 (i.e. the output of the non-linear model depends on the current input and the previous one), the metric update may need to regressively modify the previous branch metric to reflect the memory depth on 1. In other words, in instances where the memory depth of the non-linear model is m, at each iteration the metric associated with any given candidate should be updated such that to regress m previous branch metrics along with the new metric related to the new coming sample.

The cost function circuit 406 may be operable to generate metrics indicating the similarity between one or more of the partial response vectors $PR2_n^1 \ldots PR2_n^{M \times Su \times P}$ and one or more of the vectors $SCPRNL_n^1 \ldots SCPRNL_n^{M \times Su \times P}$ to generate error metrics $D_n^1 \ldots D_n^{M \times Su \times P}$. In an example implementation, the error metrics may be Euclidean distances calculated as shown below in equation 1.

$$D_n^i = |(SCPRNL_n^i) - (PR2_n^i)|^2 \qquad \text{EQ. 1}$$

for $1 \leq i \leq M \times Su \times P$.

FIGS. 5A-5E depict portions of an example sequence estimation process performed by a system configured for joint sequence estimation of symbol and phase with high tolerance of nonlinearity. In FIGS. 5A-5E it is assumed, for purposes of illustration, that M=4 (a symbol alphabet of α, β, χ, δ), Su=3 (three symbol survivors are selected each iteration), Psu=Su (three phase survivors are selected each iteration), P=3 (a phase alphabet of plus, minus, and zero), and that Q (vector length) is 4.

Figure 5A:
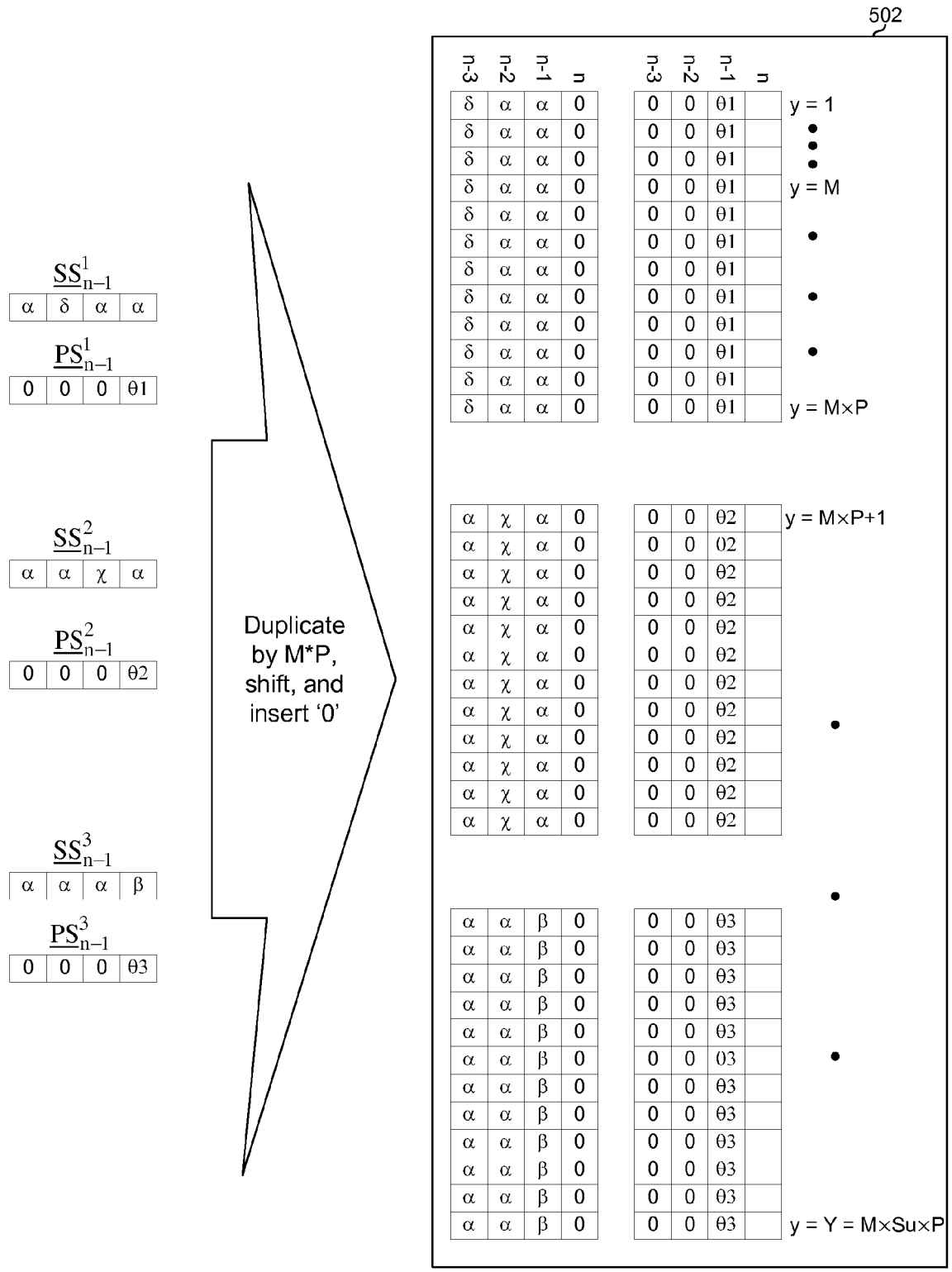
FIGS. 5A-5E depict portions of an example sequence estimation process performed by a system configured for joint sequence estimation of symbol and phase with high tolerance of nonlinearity.

Referring to FIG. 5A, there is shown phase and symbol survivors from time n−1 on the left side of the figure. The first step in generating symbol candidates and phase candidates from the survivors, with high tolerance of nonlinearity, is to duplicate the survivors, shift the contents in each of the resulting vectors called out as 502 on the right side of FIG. 5A, and additionally, for each of the symbol vectors, insert '0' in the vacant element(s). In the example implementation depicted, the survivors are duplicated M*P−1 times and shifted one element, with '0' inserted in the right-most elements of the symbol vectors.

Figure 5B:
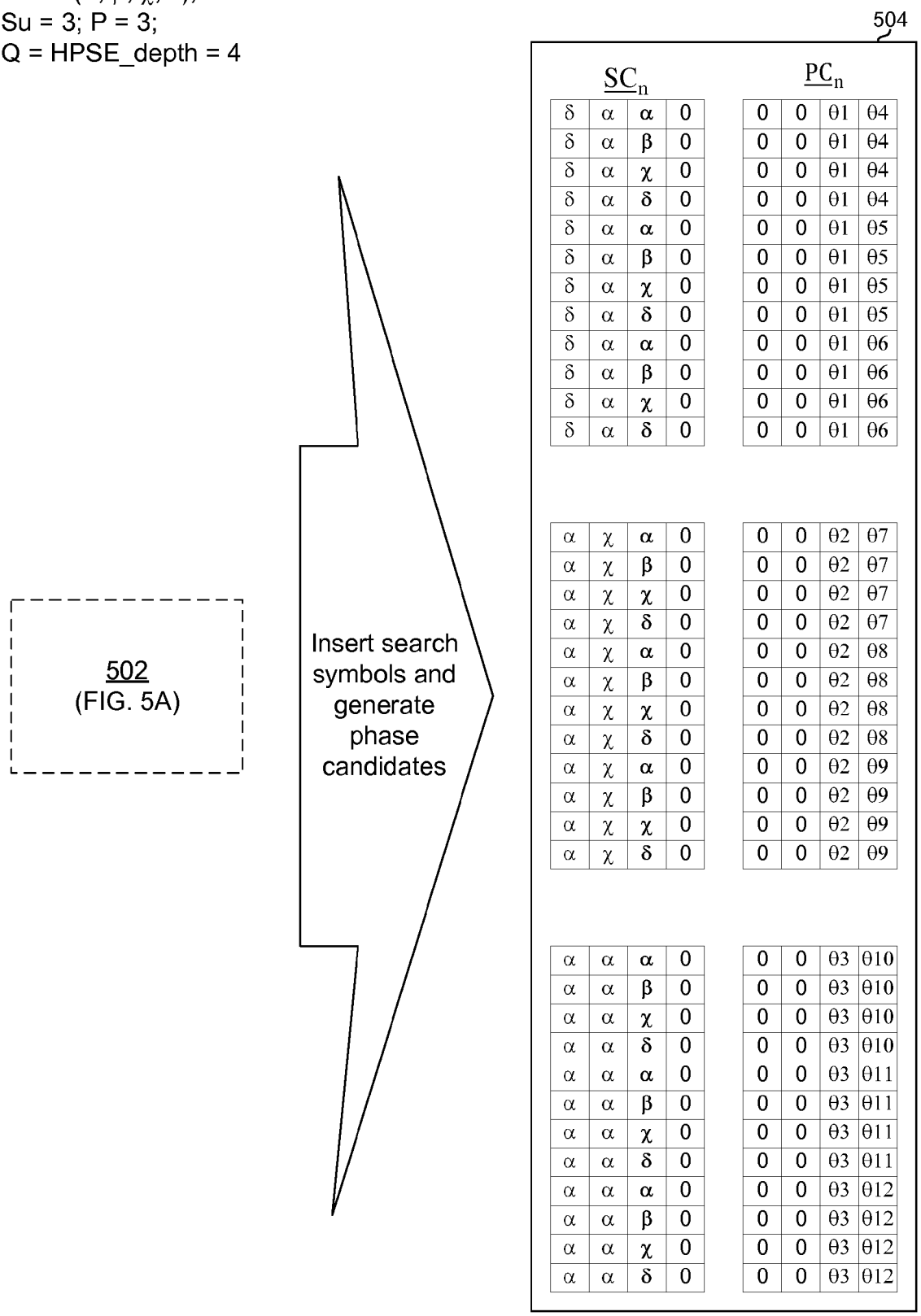

Referring to FIG. 5B, the next step in generating the candidates is inserting symbol values in the symbol vectors and phase values in the phase vectors, resulting in the vectors, $SC_n$, and phase candidates, $PC_n$ for time n (called out as 504 in FIG. 5B). In this regard, for the phase vectors, the phase values are inserted in the vacant elements of the phase vectors. For the symbol vectors, however, the symbol values are inserted in the [n−1] element rather than the [n] element of the symbol vectors.

Insertion of the symbol values into the [n−1] elements rather than the [n] element of the symbol vector may enhance estimation process in light of the use of partial response pulse shaping, and in light of the presence of nonlinearities in the transmitter and/or receivers. In this regard, because partial response signals are generated by applying a convolution function between the partial response filter taps and the mapped symbols, any symbol may typically affect a number of samples equal to the length of the partial response. The (unknown) most-recent symbol which may be up for estimation, however, may affect only the most-recent received sample. The contribution of the most-recent symbol is factored by the earliest partial response filter tap which may be configured to have relatively low amplitude in order to allow optimal pulse shaping as described, for example, in the United States patent application titled "Design and Optimization of Partial Response Pulse Shape Filter," which is incorporated herein by reference, as set forth above" which is hereby incorporated herein by reference in its entirety. Therefore, the impact of the most-recent symbol on the most-recent sample of the received signal may be small. Consequently, estimation of the most-recent symbol may be susceptible to even low levels of noise or interference—e.g., even a low level of AWGN may cause error in estimating the most-recent symbol. Errors in estimating the most-recent symbol may, in turn, impact the estimation of subsequent symbols and lead to an error burst. Thus, due to the possible low reliability in estimating the most-recent symbol, and the fact that the sequence estimation may be limited to M*Su candidates, which are very small subset of the state space, Mˆ(L−1), the survivors selection may lead to error bursts that may not otherwise occur with full MLSE search. Accordingly, to improve sequence estimation performance without increasing number of survivors (which would increase complexity), the branch metrics may calculated for the $2^{nd}$ element (i.e. the [n−1] element) in each symbol candidate, which may actually be the previous unknown symbol. In order to calculate such metrics, however, a "filler" value may need to be populated in the $1^{st}$ element of the candidate vectors such that the metrics are a fair comparison between the candidates. Accordingly, the filler values may be determined using, for example, inverse calculation for each survivor candidate to satisfy the cost function. The filler values may be calculated by, for example, the sequence estimation circuit 112. Inverse calculation is described in more detail with respect to FIG. 5C (below). Because inverse calculation may perform lower than the Maximum Likelihood (thus may cause degradation to the overall error rate), it may be necessary to repeat the estimation of symbol (for the $1^{st}$ element) using a search. In other words, the filler value is used only for calculating the branch metric during this iteration and then is discarded and/or overwritten in the next iteration. For example, in FIG. 5A, the α in the $1^{st}$ element of $SS_{n-1}^1$, the α in the $1^{st}$ element of $SS_{n-1}^2$, and β in the $1^{st}$ element of $SS_{n-1}^3$ may have each been filler values which are then discarded in FIG. 5B.

In the example implementation depicted, each of the M possible symbol values is inserted into Su*P symbol candidates at element [n−1] of the symbol vectors, and each of the P phase values may be inserted into M*Su candidates, at the vacant [n] element. In this regard, in the example implementation depicted, θ5 is a reference phase value calculated based on phase survivor $PS_{n-1}^1$. For example, θ5 may be the average (or a weighted average) of the last two or more elements of the phase survivor $PS_{n-1}^1$ (in the example shown, the average over the last two elements would be (θ5+0)/2). In the example implementation depicted, θ4=θ5−Δθ, and θ6=θ5+Δθ, where Δθ is based on: the amount of phase noise in signal 226, slope (derivative) of the phase noise in signal 226, signal-to-noise ratio (SNR) of signal 226, and/or capacity of the channel 107. Similarly, in the example implementation shown, θ8 is a reference phase value calculated based on phase survivor $PS_{n-1}^2$, θ7=θ8−Δθ, θ9=θ8+Δθ, θ11 is a reference phase value calculated based on phase survivor $PS_{n-1}^3$, θ10=θ11−Δθ, and θ2=θ11+Δθ.

Figure 5C:
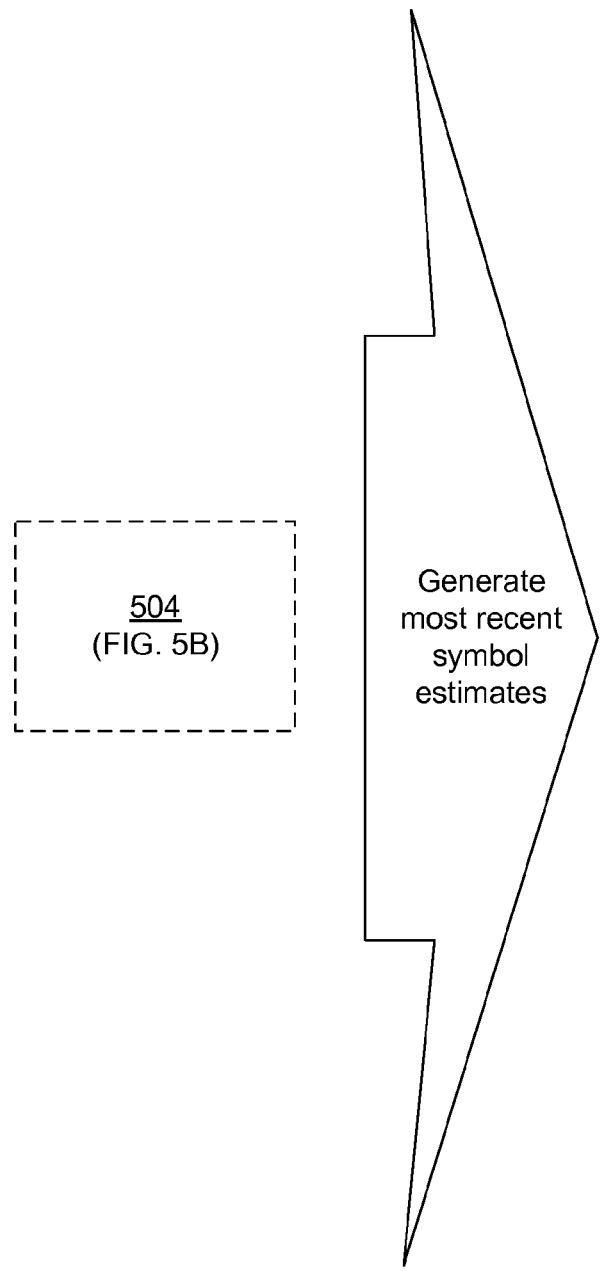

Referring to FIG. 5C, the next step is generating filler values for the $n^{th}$ elements in the symbol vectors (i.e. for insertion into elements [n] in the symbol vectors), resulting in the symbol candidates $SC_n^1 \ldots SC_n^{M \times Su \times P}$ and phase candidates $PC_n^1 \ldots PC_n^{M \times Su \times P}$ (shown as 506 in FIG. 5C). In this regard, the symbol estimates for the $n^{th}$ elements may be calculated based on best match with the received signal for purposes of making a fair comparison between the candidates.

The generation of the symbol estimates may be calculated to minimize cost function, using inverse calculation (per each candidate). In this regard, the symbol estimate calculation may be based on, for example, the symbols, partial response, and noise. For example, assuming a linear channel, the partial response received signal can be expressed by:

$$x_n = \sum_{i=1}^{N} a_{n-i} \cdot h_i + w_n = \underline{a}_n^T \cdot \underline{h} + w_n$$

where $x_n$ is the received signal at the receiver at instant n, $\underline{h}$ is a vector of the tap coefficients of the Tx partial response, $\underline{a}_n^T$ is the transposed transmitted symbols vector (i.e. the transmitted symbols resulting in $x_n$), and $w_n$ is the noise (e.g., additive white Gaussian noise or AWGN).

For the linear channel case, the sequence estimation may be configured to minimize the squared error: $|\underline{\hat{a}}_n^T \cdot \underline{\hat{h}} - x_n|^2$, where $\underline{\hat{a}}_n^T$ is the estimated symbols vector which provides the minimal value and $\underline{\hat{h}}$ is the partial response filter used by the sequence estimation. Assuming candidate symbol vector $\underline{\tilde{a}}_n^T = [\tilde{a}_1, \tilde{a}_2, \ldots, \tilde{a}_N]$, which has its most-recent element ($\tilde{a}_N$) set to zero and its $2^{nd}$ element ($\tilde{a}_{N-1}$) set to one of the possible values of the symbol to be estimated (i.e. assuming a candidate symbol vector that is the transpose of one of the symbol vectors in $SC_n$ FIG. 5B), a missing contribution parameter related to $\hat{a}_N$ may be determined to be:

$$\frac{x_n - \underline{\tilde{a}}_n^T \cdot \underline{\hat{h}}}{\hat{h}_1}$$

where $\hat{h}_1$ correspond to the coefficient of the 1st tap of the partial response used for sequence estimation.

Accordingly, the inverse calculation for $n^{th}$ element of the estimated symbols vector, $\hat{a}_N$, assuming a linear channel, may be determined by, for example, slicing the contribution parameter according to the symbol constellation used for the transmitted symbols, as expressed in equation 2 (EQ. 2):

$$\hat{a}_N = \text{slice}\left\{\frac{x_n - \tilde{a}_n^T \cdot \hat{h}}{\hat{h}_1}\right\}$$

In the presence of non-linearities, however, symbol candidate estimation may need to be configured to specifically account for nonlinearities. Thus, assuming that the distortion (e.g., nonlinear) experienced by the received signal is known to the receiver, a model of the non-linear distortion may be used during sequence estimation such that the non-linear distortion may be tolerated almost without any degradation (e.g., as determined by SER). In the presence of nonlinearity, The received signal may be expressed as:

$$x_n = \widehat{Fnl}\{\underline{a}_n^T \cdot \underline{h}\} + w_n$$

where $\widehat{Fnl}\{\cdot\}$ is the non-linear function. The non-linear model may, for example, be expressed as: $\widehat{Fnl}\{\underline{a}_n^T \cdot \underline{h}, \underline{a}_{n-1}^T \cdot \underline{h}, \ldots, \underline{a}_{n-L}^T \cdot \underline{h}\}$.

The estimation algorithm may be, for example, configured to minimize squared distance (Euclidian) cost function. The distance may be calculated between the received (equalized) signal samples and the reconstructed signal candidates. The candidate which may minimize the cost function (i.e. the best metrics) becomes the estimation solution (i.e. is selected as a survivor). If the generation of the symbol candidate does not consider the actual response of the signal (e.g., including non-linearities), the sequence estimation may converged to wrong solution(s). Accordingly, in an example embodiment, the non-linear model may be applied for each of the partial response reconstructed candidates ($SCPR_n^1$ ... $SCPR_n^{M \times Su \times P}$) prior to applying the cost function calculation (as shown in FIG. 4). Thus, the reconstructed candidates may experience the same response (e.g., including non-linearity) as the received signal and the cost function minimization may be precise and achieve solutions comparable to Maximum Likelihood (ML) solutions.

For example, assuming that $\underline{\hat{a}}_n^T$ is a candidate symbol vector (e.g., one of the symbol candidates $SC_n^1$ ... $SC_n^{M \times Su \times P}$), then applying the non-linear model to that vector would result in: $\widehat{Fnl}\{\underline{\hat{a}}_n^T \cdot \hat{h}\}$, the reconstructed partial response signal incorporating the non-linear model (e.g., a most-recent sample of one of $SCPRNL_n^1$ ... $SCPRNL_n^{M \times Su \times P}$). The squared error signal (e.g., one of $D_n^1$ ... $D_n^{M \times Su \times P}$) may then be revised to the form: $|x_n - \widehat{Fnl}\{\underline{\hat{a}}_n^T \cdot \hat{h}\}|^2$.

In an example implementation, the combination of the revised sequence estimation process described above and the incorporation of the non-linear model may be further adjusted. For example, because the candidates initially (after 504 of FIG. 5B) have zeros instead of the most-recent symbol, the execution of the non-linear model may incorporate some error in comparison to a fully symbol populated candidates. Assuming that the error is sufficiently small (because of the small contribution of the most-recent symbol due to the substantial ISI in PR implementations), the error may be corrected using, for example, linear extrapolation:

$$f_{NL}(y + \Delta y) \cong f_{NL}(y) + f'_{NL}(y) \cdot \Delta y$$

$$\Delta y = \frac{f_{NL}(y + \Delta y) - f_{NL}(y)}{f'_{NL}(y)}$$

Where $f'_{NL}(y)$ is the slope of the non-linear model $f_{NL}(y)$, both are known to the receiver.

Assuming that $\Delta y = \hat{a}_N \cdot \hat{h}_1$, which is the contribution of the unknown most-recent symbol candidate $\hat{a}_N$, and $y = \underline{\tilde{a}}_n^T \cdot \hat{h}$ is the known contribution of candidate vector $\underline{\tilde{a}}_n^T$, then the unknown most-recent symbol under the non-linear model may be determined, as expressed in equation 3 (EQ. 3), to be:

$$\Delta y = \hat{a}_N \cdot \hat{h}_1 = \frac{x_n - f_{NL}\{\tilde{a}_n^T \cdot \hat{h}\}}{f'_{NL}\{\tilde{a}_n^T \cdot \hat{h}\}}$$

Therefore, the value of the most-recent symbol may be the value obtained by slicing, (according to the symbol constellation in use), the value obtained from equation 3, as shown in equation 4 (EQ. 4), which to generate the filler values used in FIG. 5C.

$$\hat{a}_N = \text{slice}\left[\frac{x_n - f_{NL}\{\tilde{a}_n^T \cdot \hat{h}\}}{f'_{NL}\{\tilde{a} \cdot \hat{h}\} \cdot \hat{h}_1}\right]$$

Where:

$$\tilde{\underline{a}}_n^y = [a_1^y, a_2^y, \ldots, a_{n-1}^y, 0]$$

Accordingly, the $y^{th}$ symbol vector candidate (e.g., as shown in 506) used to generate the metrics may be expressed as:

$$SC_n^y = [a_1^y, \ldots, \text{Sym}^y, \hat{a}_n^y]$$

where $\text{Sym}^y$ may be one of the M possible symbol values inserted for the search (e.g., the shifted nth element of the same candidate in the previous iteration)

Figure 5D:
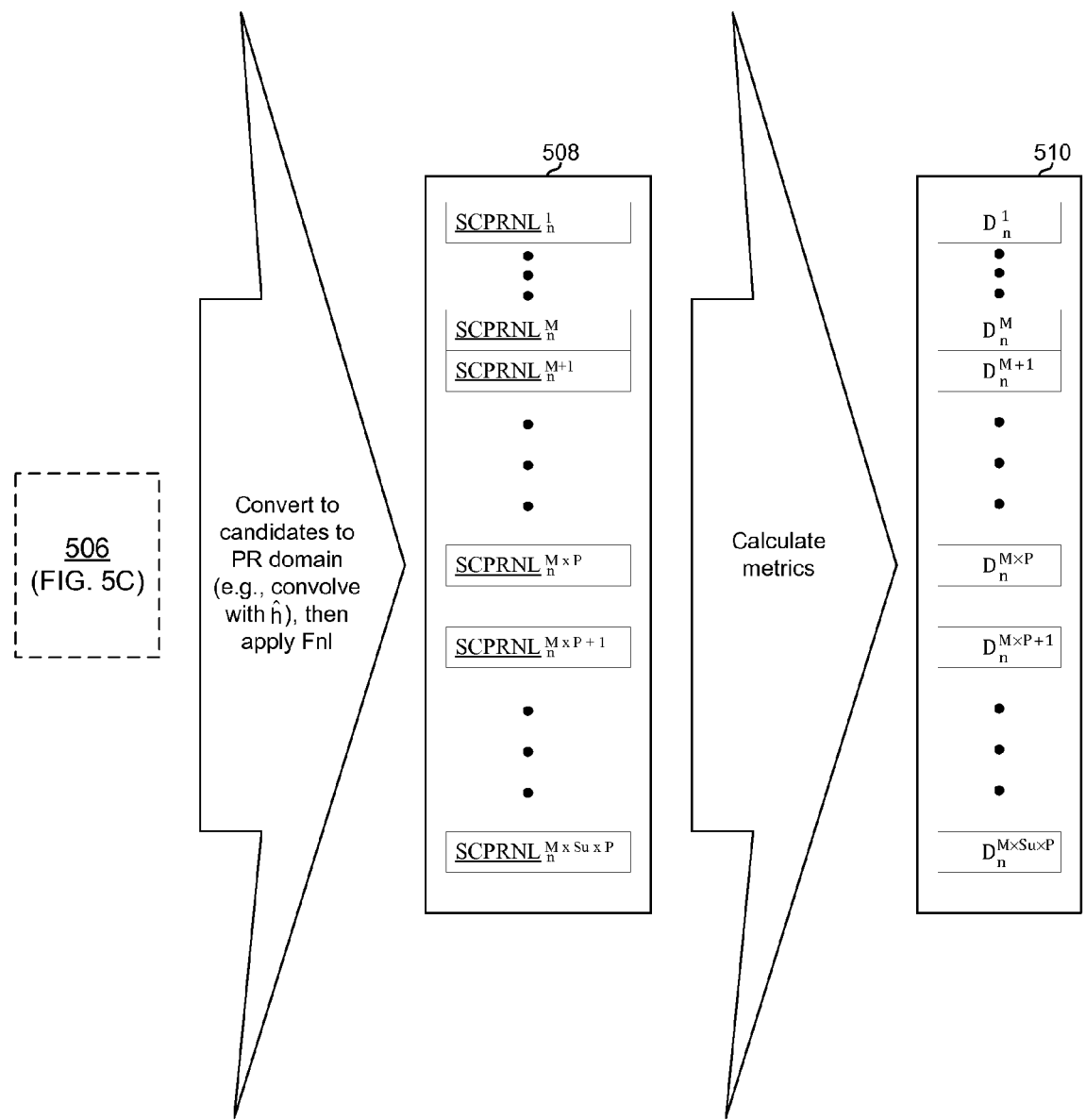

Referring to FIG. 5D, with reference to FIG. 4. The symbol candidates are then transformed to the partial response domain via a convolution (e.g., in circuit 404) and the non-linear model may then be applied to all the candidates (e.g., by non-linearity function $\widehat{Fnl}$ in circuit 408), the reference signal PR1 is phase adjusted, and then the metrics $D_n^1$ ... $D_n^{M \times Su \times P}$ are calculated based on the partial response signals $PR2_n^1$ ... $PR2_n^{M \times Su \times P}$ and $SCPRNL_n^1$ ... $SCPRNL_n^{M \times Su \times P}$.

Figure 5E:
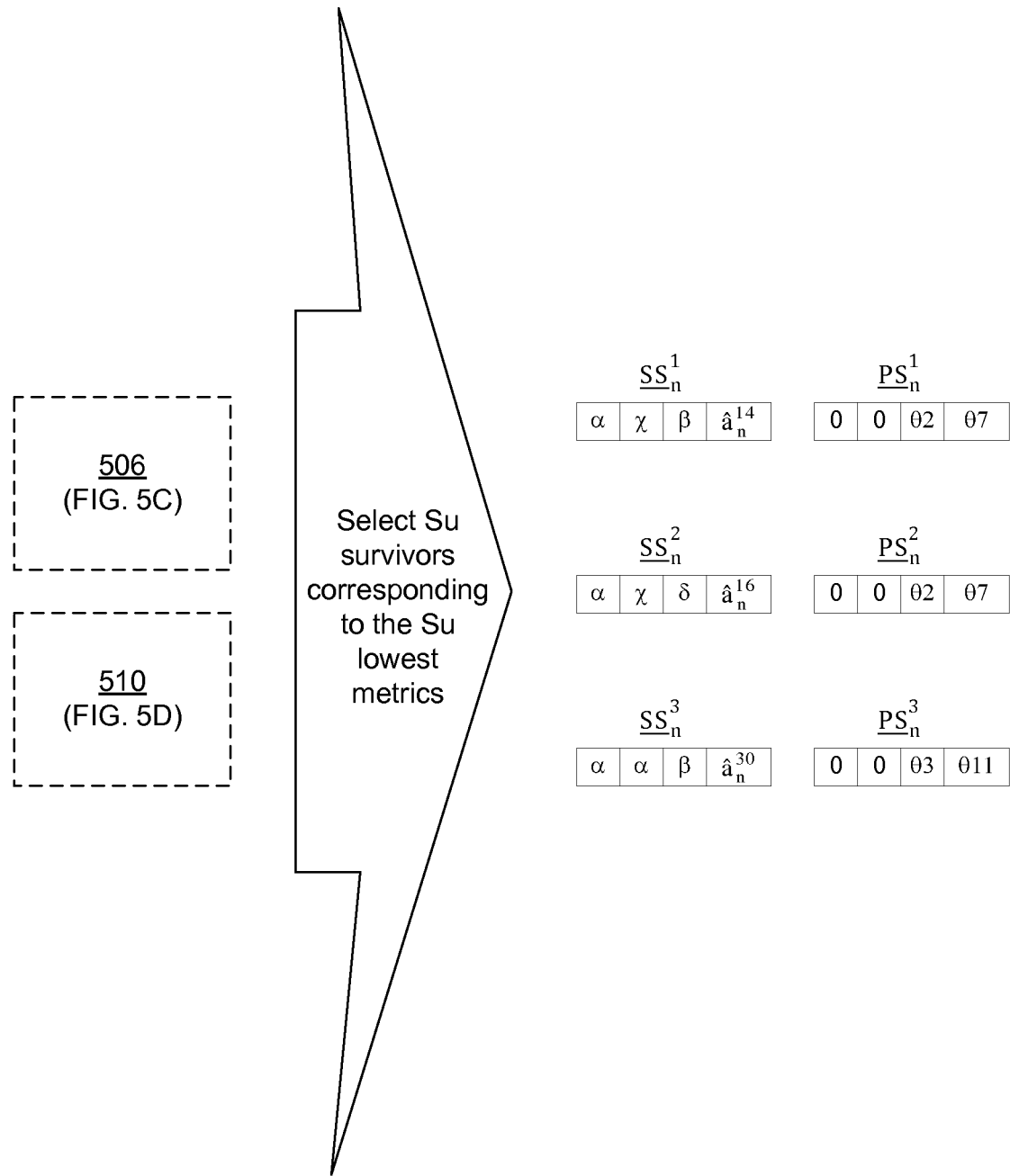

Referring to FIG. 5E, the metrics calculated in FIG. 5D are used to select which of the candidates generated in FIG. 5C are selected to be the survivors for the next iteration of the sequence estimation process. FIG. 5E depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5E may result in selecting identical symbol candidates which may be undesirable. An Example of survivor selection process that prevents redundant symbol survivors is described in FIG. 6 and in the United States patent application titled "Low-Complexity, Highly-Spectrally-Efficient Communications," which is incorporated herein by reference, as set forth above.

Figure 6:
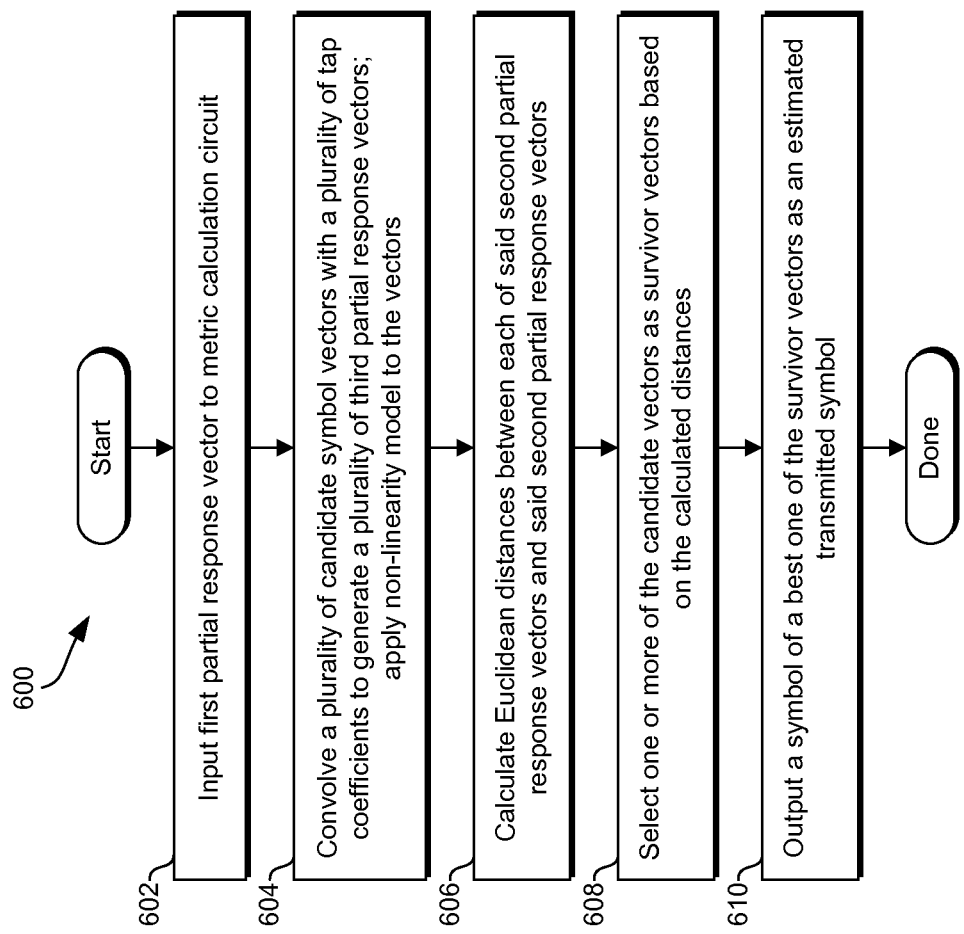
FIG. 6 is a flowchart illustrating an example process for sequence estimation, with high tolerance of nonlinearity, for reception of partial response signals.

FIG. 6 is a flowchart illustrating an example process for sequence estimation, with high tolerance of nonlinearity, for reception of partial response signals. The process begins with block 602 in which a first partial response vector (e.g., PR1) is input to a vector calculation circuit (e.g., circuit 402). In block 604, a plurality of second partial response phase vectors (e.g., $PR2_n^1 \ldots PR2_n^{M \times Su \times P}$) are generated based on the first partial response vector and a plurality of phase candidate vectors (e.g., $PC_n^1 \ldots PC_n^{M \times Su \times P}$). In block 606, a plurality of candidate symbol vectors (e.g., $SC_n^1 \ldots SC_n^{M \times Su \times P}$) are convolved with a plurality of tap coefficients (e.g., tap coefficients corresponding to response ĥ) to generate a plurality of third partial response symbol vectors (e.g., $SCPR_n^1 \ldots SCPR_n^{M \times Su \times P}$). Furthermore, in some instances the non-linearity model, $\widehat{Fnl}$, may be applied to the plurality of third partial response symbol vectors to generate a plurality of non-linear adjusted candidate partial response vector $SCPRNL_n^1 \ldots SCPRNL_n^{M \times Su \times P}$). In block 608, metrics (e.g., Euclidean distances between the vectors) are generated based on the second partial response phase vectors and the third partial response vector are generated (e.g., by circuit 406). In block 610, one or more of the candidate vectors is selected based on the metrics generated in block 608. In block 612, a symbol a best one of the survivor vectors (e.g., survivor vector corresponding to the lowest metric) is output to as an estimated transmitted symbol to a de-mapper.

In an example implementation of this disclosure, a receiver may receive a single-carrier inter-symbol correlated (ISC) signal (e.g., signal 68 or signal 120) that was generated by passage of symbols through a non-linear circuit (e.g., circuit 106 and/or circuit 108). The receiver may generate estimated values of the transmitted symbols using a sequence estimation process (e.g., implemented by circuit 62) and a model of non-linear circuit (e.g., implemented by circuit(s) 236a and/or 236b). The ISC signal may be a partial response signal generated via a partial response filter (e.g., a partial response filter comprising filter(s) 104 and/or 109). The receiver may generate an ISC feedback signal (e.g., signal 203), and control an equalizer of the receiver based on the ISC feedback signal. The receiver may generate an ISC feedback signal (e.g., signal 207), and control a carrier circuit based on the ISC feedback signal.

The sequence estimation process may comprise convolving each one of a plurality of candidate symbol vectors (e.g., each one of vectors $SC_n^1 \ldots SC_n^{M \times Su \times P}$) with a plurality of tap coefficients to generate a corresponding one of a plurality of first ISC vectors (e.g., one of vectors $SCPR_n^1 \ldots SCPR_n^{M \times Su \times P}$). Furthermore, in some instances non-linearity model, $\widehat{Fnl}$, may be applied to the plurality of first ISC vectors to generate a plurality of non-linear adjusted ISC vectors $SCPRNL_n^1 \ldots SCPRNL_n^{M \times Su \times P}$). The sequence estimation process may comprise generating a plurality of metrics (e.g., metrics $D_n^1 \ldots D_n^{M \times Su \times P}$), each one of the metrics corresponding to the result of a cost function calculated using one of the first ISC vectors (e.g., $SCPR_n^1$) and a second ISC vector (e.g., $PR2_n^1$). The plurality of tap coefficients may be based on tap coefficients of a partial response filter (e.g., tap coefficients of filter(s) 104 and/or 109). The sequence estimation process may comprise selecting one of the candidate symbol vectors ($SC_n^1$) based on the plurality of metrics. The sequence estimation process may comprise outputting a symbol of the selected candidate symbol vector (e.g., the symbol at index q2 of symbol candidate $SC_n^1$) as one of the estimated values of the transmitted symbols.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a sequence estimation circuit operable to:
generate a plurality of candidate vectors, wherein:
each of said plurality of candidate vectors comprises a plurality of elements ranging from a least-recent element to a most-recent element;
each of said plurality of candidate vectors contains, in an element other than its said most-recent element, a respective one of a plurality of symbol values to be searched; and
each of said plurality of candidate vectors contains, in its said most-recent element, a respective one of a corresponding plurality of filler values;
calculate a plurality of branch metrics corresponding to the plurality of candidate vectors; and
select, based on said plurality of branch metrics, one of said plurality of candidate vectors to be output for use by another circuit.

2. The system of claim 1, wherein:
said plurality of candidate vectors consists of M, an integer, candidate vectors; and
each of said plurality of symbol values to be searched corresponds to a respective one of M values of an M-QAM constellation.

3. The system of claim 1, wherein, as part of said calculation of said plurality of branch metrics, said sequence estimation circuit is operable to convolve each of said plurality of candidate vectors with a plurality of tap coefficients to generate a corresponding plurality of candidate partial response vectors.

4. The system of claim 3, wherein, as part of said calculation of said plurality of branch metrics, said sequence estimation circuit is operable to apply a non-linearity model to each of said plurality of candidate partial response vectors to generate a corresponding one of a plurality of partial response reconstructed candidates.

5. The system of claim 4, wherein, as part of said calculation of said plurality of branch metrics, said sequence estimation circuit is operable to calculate a Euclidean distance between each of said plurality of partial response reconstructed candidates and a corresponding one of a plurality of vectors generated from a signal whose values are to be estimated by said sequence estimation circuit.

6. The system of claim 1, wherein said sequence estimation circuit is operable to perform an inverse calculation to determine each of said plurality of filler values.

7. The system of claim 6, wherein said inverse calculation uses a model of non-linearity experienced by a signal whose values are to be estimated by said sequence estimation circuit.

8. The system of claim 1, wherein:
said sequence estimation circuit is operable to determine each of said plurality of filler values; and
for any particular one of said plurality of candidate vectors, determining a corresponding one of said plurality of filler values comprises insertion of a zero into said most-recent element of said particular one of said plurality of candidate vectors to generate a zero-filled vector.

9. The system of claim 8, wherein, as part of said determination of said corresponding one of said plurality of filler values, said sequence estimation circuit is operable to determine a contribution of a most-recent symbol of a received signal based on said zero-filled vector.

10. The system of claim 9, wherein, as part of said determination of said contribution of said most-recent symbol of said received signal, said sequence estimation circuit is operable to perform a slicing operation.

11. A method comprising:
in a sequence estimation circuit of a receiver:
generating a plurality of candidate vectors, wherein:
each of said plurality of candidate vectors comprises a plurality of elements ranging from a least-recent element to a most-recent element;
each of said plurality of candidate vectors contains, in an element other than its said most-recent element, a respective one of a plurality of symbol values to be searched; and
each of said plurality of candidate vectors contains, in its said most-recent element, a respective one of a corresponding plurality of filler values;
calculating a plurality of branch metrics corresponding to the plurality of candidate vectors; and
selecting, based on said plurality of branch metrics, one of said plurality of candidate vectors to be output for use by another circuit.

12. The method of claim 11, wherein:
said plurality of candidate vectors consists of M, an integer, candidate vectors; and
each of said plurality of symbol values to be searched corresponds to a respective one of M values of an M-QAM constellation.

13. The method of claim 11, wherein said calculating of said plurality of branch metrics comprises convolving each of said plurality of candidate vectors with a plurality of tap coefficients to generate a corresponding plurality of candidate partial response vectors.

14. The method of claim 13, wherein said calculating said plurality of branch metrics comprises applying a non-linearity model to each of said plurality of candidate partial response vectors to generate a corresponding one of a plurality of partial response reconstructed candidates.

15. The method of claim 14, wherein said calculating said plurality of branch metrics comprises calculating a Euclidean distance between each of said plurality of partial response reconstructed candidates and a corresponding one of a plurality of vectors generated from a signal whose values are to be estimated by said sequence estimation circuit.

16. The system of claim 11, comprising performing an inverse calculation to determine each of said plurality of filler values.

17. The system of claim 16, wherein said inverse calculation uses a model of non-linearity experienced by a signal whose values are to be estimated by said sequence estimation circuit.

18. The method of claim 11, comprising:
determining each of said plurality of filler values, wherein for any particular one of said plurality of candidate vectors, determining a corresponding one of said plurality of filler values comprises inserting a zero into said most-recent element of said particular one of said plurality of candidate vectors to generate a zero-filled vector.

19. The method of claim 18, wherein said determining said corresponding one of said plurality of filler values comprises determining a contribution of a most-recent symbol of a received signal based on said zero-filled vector.

20. The method of claim 19, wherein said determining said contribution of said most-recent symbol of said received signal comprises performing a slicing operation.

* * * * *